Patented Sept. 6, 1949

2,480,869

UNITED STATES PATENT OFFICE 2,480,869

SEED FOR PRODUCTION OF TITANIUM DIOXIDE AND PROCESS OF MAKING SAME

Max J. Mayer, Scarsdale, N. Y.

No Drawing. Application December 30, 1943, Serial No. 516,212

19 Claims. (Cl. 23—202)

The present invention relates to the production of titanium dioxide and has particular reference to a seed for the preparation of titanium dioxide.

Many methods have been proposed for the preparation of nuclear dispersions of materials to induce rutilization when used in the hydrolysis of titanium sulfate and other solutions and the hydrolysate calcined. The dispersing media for these seed dispersions are monobasic acids, for example HCl. Titanium dioxide is generally proposed as the seeding agent, but tin dioxide and other oxides of the metals of the fourth group have been suggested. Among the patents which describe such nuclear dispersions may be mentioned United States Patents Nos. 2,062,133; 2,285,485; 2,285,486; 2,301,412; 2,303,305; 2,303,306 and 2,305,307 and British Patents Nos. 405,669 and 533,227.

This art teaches that the presence of sulfate ions in these nuclear dispersions is harmful. For example, United States Patent No. 2,303,306 and British Patent No. 533,227 state that sulfate ions should be removed, and United States Patent No. 2,285,486 states that salts of polyvalent acids should be avoided.

I have surprisingly discovered that sulfate ions under certain conditions have a very beneficial action on the seed dispersion.

In most of prior art practice, concentration of $TiO_2$ in the seed dispersion is relatively low; that is, 20 g./l. $TiO_2$ or less. Also, most of the prior art is founded upon and recommends the use of relatively large quantities of seed for hydrolysis; that is, from 8 to 20% of the $TiO_2$ content of the hydrolysis solution. Such seed dispersions in the quantities recommended consequently require rather large volumes of the seed dispersions for hydrolysis, thus rendering the operation cumbersome and costly.

I have found that limited quantities of sulfate ions have a stabilizing effect on these seed dispersions. Due to this action, I have been able to prepare highly effective seed dispersions of much higher concentration than heretofore, as well as highly effective seed dispersions of lower concentrations of $TiO_2$.

Among the objects of this invention is the preparation of improved nuclear dispersions of seed for hydrolysis of titanium salt solutions, utilizing the beneficial effects of stabilizers according to my discovery.

A further object of my invention is the preparation of nuclear seed dispersions in concentrated as well as dilute state that will serve effectively and efficiently for hydrolysis of titanium salt solutions whether such seed dispersions are employed therefor immediately or substantially long periods after preparation.

Another object of this invention is to prepare stabilized nuclear dispersions of seed from sols of oxides of titanium or other metals of the fourth group peptized with a monobasic acid.

More specifically, it is an object of this invention to prepare the aforesaid stabilized nuclear dispersions of seed by means of stabilizers containing polyvalent anions and which are volatile under calcining conditions; that is, those stabilizers which disappear during calcination as such as well as those which decompose into volatile products during calcination.

Other, further and more specific objects of this invention will become readily apparent to persons skilled in the art from a consideration of the following description, including specific examples.

When dispersions containing 20 g./l. $TiO_2$, or more, are formed without stabilizing agents, precipitates form on standing and at the higher concentrations the seed dispersions must be employed almost immediately after preparation in order to utilize their initial efficiency. By using stabilizing agents with dispersions of these concentrations of $TiO_2$, the need for immediate use of the dispersions after their preparation is overcome.

At $TiO_2$ concentrations below 20 g./l., sulfate ions have been found to cause an initial flocculation which disappears after a short time, resulting in a stable seed dispersion.

The amount of sulfuric acid should generally not exceed 6.5% by weight of the $TiO_2$ content or 55 millimols of $H_2SO_4$ per mol of $TiO_2$, in order to form a stable dispersion and the minimum amount is slightly under 0.5%, or 4 millimols of $H_2SO_4$ per mol of $TiO_2$.

When preparing the seed by peptization of a titanium hydrate precipitated from a sulfate solution, the sulfate content of the hydrate may be adjusted to the desired value by washing, neutralization, etc. However, a better control is obtained by removing all of the sulfate radicals and then adding the desired amount of sulfate radicals. When preparing the seed dispersion from a hydrate prepared from a salt solution other than sulfate, or directly from a solution of a titanium salt of a monobasic acid, the sulfate ion is, of course, added. The sulfate ion should be added prior to the curing step that develops the nuclear properties.

Hydrochloric acid is the preferred dispersing medium and for good dispersion the weight ratio of HCl to $TiO_2$, or other oxide, should be of 0.45:1 to 1:1. This corresponds to a molecular or molar ratio of 1:1 to 2.2:1. When using other monobasic acids, the amounts preferably fall within this molar ratio range.

The solutions of $TiO_2$, or other oxide, preferably containing from 20 to 90 g./l. $TiO_2$ and from 1 to 2.2 mols of monobasic acid per mole of $TiO_2$ and the sulfate ions, are heated to a temperature of from 70° C. to the boiling point thereof for 10 to 30 minutes to develop the nuclear properties. Heating about 10 minutes at 85 to 95° C. has also been found suitable. Upon completion of the curing, the seed dispersion is cooled quickly to a temperature of about 60° C. or lower. When properly cured, the dispersion has an opalescent appearance and shows a Tyndall effect or Brownian movement, or both. When properly stabilized, there will be no permanent precipitate formed in the seed dispersion even after prolonged standing.

The following examples are illustrative:

Example I

Titanyl sulfate ($TiO.SO_4.2H_2O$) was dissolved in water to form a pure titanium sulfate liquor and five portions were treated with sodium carbonate to raise the pH values to 3.5, 4.5, 5.5, 6.5 and 7.5 and the hydrates of each portion washed until the filtrates showed no precipitate with $BaCl_2$. The washed hydrates were then tested for sulfate and showed the following amounts, calculated as $H_2SO_4$:

| pH of ppt | 3.5 | 4.5 | 5.5 | 6.5 | 7.5 |
|---|---|---|---|---|---|
| Per Cent $H_2SO_4$ | 23.2 | 3.6 | 2.9 | 0.49 | 0.16 |

The hydrates were then peptized with hydrochloric acid to form sols containing 60 g./l. $TiO_2$ and 36 g./l. HCl. The sols were then cured by heating to 90° C. in 15 minutes and holding this temperature for ten minutes, and were then immediately cooled to below 60° C. The resulting dispersions prepared from hydrates precipitated at pH values of 4.5, 5.5 and 6.5 were stable, but those prepared from the hydrates precipitated at pH values of 3.5 and 7.5 were unstable, owing to excess of sulfate in one case and deficiency of sulfate in the other.

Example II

A pure titanium chloride solution prepared from titanium tetrachloride and containing 160 g./l. $TiO_2$ and 188 g./l. HCl was treated with $Na_2CO_3$ to raise the pH to 6.5 and the precipitate washed until the filtrate was chloride free. The precipitate was peptized with HCl in amount such that the weight ratio of HCl to $TiO_2$ was 0.6 to 1.0. The sol was then divided into aliquot parts and treated with $H_2SO_4$ in amounts of 0.0, 0.5, .75, 1.0, 1.5, 2.0, 2.5, 3.0, 4.0, 5.0 and 6.0% by weight of the $TiO_2$ content. Each portion was then cured by heating up to 90° C. in 15 minutes and maintaining this temperature for 10 minutes, and then quickly cooling to below 50° C.

The seed containing no $H_2SO_4$ was opaque, and a white precipitate formed after one hour. The other seeds were opalescent and stable. After two weeks, the seeds treated with 2.5 to 6% $H_2SO_4$ were still colloidal. The other seeds had precipitated within two weeks, but of these it was noted that from day to day the seeds were progressively more stable with increase in sulfate content. It is not practical to employ less $H_2SO_4$ than 0.5% by weight of $TiO_2$ content.

Example III

An iron free solution of titanium tetrachloride was precipitated at pH 7.5 with sodium carbonate. The hydrate was washed until the filtrate was substantially free of chloride ions, and peptized with hydrochloric acid in amount such that the weight ratio of HCl to $TiO_2$ was 0.6 to 1.0. The concentration was adjusted to 60 g./l. $TiO_2$. To separate portions of the sol were added $H_2SO_4$ in amounts of 0.3% and 0.6% by weight of the $TiO_2$ content, and each portion was cured at 90° C. and then cooled to below 60° C. The seed containing 0.3% $H_2SO_4$ was unstable, while that containing 0.6% $H_2SO_4$ was stable.

Example IV

A titanium tetrachloride solution was precipitated with alkali at pH 6.5, washed substantially free of chloride ions and peptized with hydrochloric acid to a $TiO_2$ concentration of 60 g./l., and a weight ratio of HCl to $TiO_2$ of 0.6 to 1.0. Portions of the peptized material were then diluted to 5, 10, 20 and 30 g./l. $TiO_2$. Each of these portions was then further divided into 2 parts and cured. To one half no sulfuric acid was added, but to the other half 3% $H_2SO_4$ by weight of the $TiO_2$ content was added in each case prior to curing, which was at 90° C. for ten minutes.

There was a tendency for all seeds to gel, particularly at concentrations of 20 g./l. $TiO_2$ or lower. The 30 g./l. $TiO_2$ group showed the tendency only slightly. All gels, however, redispersed on cooling and standing, the time for redispersion increasing with decreasing $TiO_2$ concentration. Gelling occurred only on heating. The gels of the seeds containing sulfuric acid were slower in redispersing. In the cases of seeds with 5 and 10 g./l. $TiO_2$ the amount of water was greater than the gel could absorb and it settled to the bottom, to be later redispersed.

The stability of the seeds increased with decreasing $TiO_2$ concentration and all seeds showed some stability. In every case, however, the seeds containing sulfuric acid were more stable than the corresponding seed without sulfuric acid.

Unstable seeds, as distinguished from gelled seeds, are those, the particles of which have grown too large to have colloidal characteristics, do not show Brownian movement, settle as "white seed," and are not redispersed by agitation or aging. Thus gelled seeds and unstable seeds are at opposite ends on the scale of the particle size.

Example V

Titanium hydrate was precipitated from a pure titanium sulfate solution at a pH of 7.5 and the precipitate repeatedly washed until the precipitate contained less than 0.2% $H_2SO_4$. The precipitate was then peptized with hydrochloric acid to form a sol containing 60 g./l. $TiO_2$ and 36 g./l. HCl. Aliquot parts of the sol were then treated with $H_2SO_4$ in amounts of 5.0, 5.5, 6.0, 6.5, 7.0 and 7.5% by weight of the $TiO_2$ content and each portion cured at 90° C. for ten minutes. The seed dispersions to which 6.5% $H_2SO_4$ or less were added were all stable while those to which 7.0 and 7.5% $H_2SO_4$ were added were unstable.

In all of the foregoing examples, the seeds were suitable for seeding hydrolyzable titanium salt solutions in the preparation of rutile titanium dioxide and those which were stable were also suitable after standing, such stable solutions producing on standing substantially the same results as when used immediately.

The seed dispersions need not be prepared by peptization of a precipitated hydrate, but may be prepared from titanium tetrachloride or titanyl chloride solutions. However, the use of the peptization procedure is a preferred mode of carrying out the invention since it admits of better control of the titanium dioxide-monobasic acid ratio.

The expression "cure" and its derivatives are used herein to denote the conversion of orthotitanic acid sols prepared with monobasic acid, which sols are soluble in dilute acids, as well as other compounds of titanium and monobasic acid, which compounds are soluble in dilute acids, into sols of metatitanic acid which are insoluble in dilute acids.

The term "seed dispersion" is intended to refer to the cured seed whether formed from a solution or from dispersed titanium dioxide. In the cured seed the discrete particles are present which show the Tyndall effect and Brownian movement.

The term "stabilize" and its derivatives are used herein to denote the prevention of secondary agglomeration of the cured seed after the primary growth thereof has been arrested, with consequent impartation to the dispersed titanium hydrate seed of the property of maintaining practically its entire activity, potency and efficiency as a seed for prolonged period of time after stabilization as distinguished from the relatively short period of effectiveness of the dispersed titanium hydrate seed before stabilization.

In lieu of sulfates, I may employ the molar equivalents of other volatile stabilizers which are decomposed under the calcining conditions in the production of pigment and which contain polyvalent anions; for example arsenic, boric, oxalic, tartaric, succinic, maleic and amino acids and their salts and those of the aromatic series.

The following additional examples are illustrative:

Example VI

A sol of orthotitanic acid peptized with HCl and having a weight ratio of HCl to $TiO_2$ of 0.6 to 1.0 was divided into 2 portions. To one portion was added a solution of $Na_2HAsO_4.7H_2O$ equivalent to an amount of $H_2SO_4$ equal to 0.5% by weight of the $TiO_2$ content of the sol and to the other portion the arsenate solution added was equivalent to an amount of $H_2SO_4$ equal to 5.0% by weight of the $TiO_2$ content of the sol. Each portion was diluted to 60 g./l. $TiO_2$, heated at 90° C. for 10 minutes, after allowing 15 minutes for reaching such temperature, and then cooled quickly. Of the nuclear dispersions resulting, that with the lower amount of arsenate solution showed borderline stability, while the other was a thin stable dispersion.

When employed as seed, each nuclear dispersion served to produce pigments practically wholly of rutile structure, good color and high tinting strength.

Example VII

This was similar to Example VI, except that molecular equivalents of citric acid were used as stabilizer in place of the arsenate solutions. The character of seed produced and the effectiveness as seed in each case were practically the same as when the corresponding quantity of arsenate was used as stabilizer in the preceding example.

Example VIII

Portions of the same type of sol were used as in Example VI and VII. For stabilization, $H_3BO_3$ equal to 2% and 4%, respectively, of the $TiO_2$ content of the sol were employed for the first and second portions. Both of the resulting nuclear dispersions were thin and slightly opalescent.

When employed as seed, each nuclear dispersion served to produce pigments practically entirely of rutile structure, good color and high tinting strength.

I have found that when $HNO_3$ is used as the peptizing monobasic acid instead of HCl, the results are substantially alike.

As the ratio of HCl or other monobasic acid to $TiO_2$ in the sol is increased, it becomes more difficult to stabilize the seed.

The stabilizer must be present during the curing. Where stabilized seeds are prepared from sols, the stabilizer may be in or added to either the orthotitanic acid, peptizing acid or peptized sol prior to curing.

At higher concentrations of $TiO_2$ in the sol, the effective range in the quantity of stabilizer is narrowed, as will be seen from the following:

Example IX

In this case, the $TiO_2$ in the sol was 90 g./l. while the HCl to orthotitanic acid ratio was 0.6 to 1.0, as in the prior examples. $H_2SO_4$ was used as the stabilizer. Where the $H_2SO_4$ equalled 2% by weight of the $TiO_2$ content, a borderline stabilization resulted. The best stabilization occurred with about 4% $H_2SO_4$ relative to $TiO_2$ content of the sol. Raising the amount of $H_2SO_4$ to 6% resulted in a seed dispersion which was better than with 2% but not as good as with 4%.

I have found that with the ratio of $TiO_2$ to monobasic peptizer acid constant, the highest effective concentration of stabilizer per unit of $TiO_2$ decreases gradually with increase in concentration of $TiO_2$ in the sol above 60 g./l., while the lowest effective concentration of stabilizer per unit of $TiO_2$ rises rather abruptly with such increase in concentration of $TiO_2$ in the sol.

The term "dispersion" is used in the claims to designate solutions and colloidal solutions.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a process of making a rutile inducing seed for use in hydrolysis of hydrolyzable titanium salt solutions, heating at a temperature from 70° C. to boiling a dispersion containing a stabilizer which on calcination volatilizes before the temperature reaches 950° C. and has polyvalent anions and a member of the class consisting of the monobasic-acid salts of the metals of the fourth group and the orthohydrates of the metals of the fourth group peptized with a mono-basic acid, the monobasic-acid referred to in said class being 1 to 2.2 mols per mol of the metal of the fourth group and the amount of stabilizer being 4 to 55 millimols per mol of metal of the fourth group, said heating being carried out until curing is effected, and then rapidly cooling below 60° C.

2. The process claimed in claim 1, wherein the monobasic-acid is an inorganic acid.

3. The process claimed in claim 1, wherein the metal of the fourth group is titanium.

4. The process claimed in claim 1, wherein the polyvalent anions are $SO_4$.

5. The process claimed in claim 1, wherein the metal of the fourth group is titanium, the monobasic-acid is an inorganic acid and the stabilizer is $H_2SO_4$.

6. In a process of making a rutile inducing seed for use in hydrolysis of hydrolyzable titanium salt solutions, heating at a temperature of 70° C. to boiling a dispersion containing a stabilizer which on calcination volatilizes before the temperature reaches 950° C. and has polyvalent anions and an orthohydrate of a metal of the fourth group peptized with a mono-basic acid, said mono-basic acid being 1 to 2.2 mols per mol of the metal of the fourth group and the amount of stabilizer being 4 to 55 millimols per mol of the metal of the fourth group, said heating being carried out until curing is effected, and then rapidly cooling to below 60° C.

7. The process claimed in claim 6, wherein the mono-basic acid is an inorganic acid.

8. The process claimed in claim 6, wherein the metal of the fourth group is titanium.

9. The process claimed in claim 6, wherein the polyvalent anions are $SO_4$.

10. The process claimed in claim 6, wherein the metal of the fourth group is titanium, the mono-basic acid is an inorganic acid and the stabilizer is $H_2SO_4$.

11. A stabilized heat-cured rutile inducing seed comprising nuclei of a titanium dioxide dispersed in a monobasic acid and stabilized with 0.5 to 6.5% sulfuric acid by weight of the $TiO_2$ content, the molar ratio of monobasic acid to $TiO_2$ being from about 1 to 2.2.

12. The seed claimed in claim 11, wherein the titanium dioxide content is 20 to 90 grams per liter.

13. The seed claimed in claim 11, wherein the monobasic acid is hydrochloric acid.

14. A stabilized heat-cured rutile inducing seed comprising nuclei of a titanium dioxide dispersed in a monobasic acid and stabilized with stabilizer in amount of 0.5 to 6.5% by weight of the $TiO_2$ content, said stabilizer having polyvalent anions and on calcination volatilizing before the temperature reaches 950° C., the molar ratio of monobasic acid to $TiO_2$ being from about 1 to 2.2.

15. The seed claimed in claim 14, wherein the titanium dioxide content is 20 to 90 grams per liter.

16. The seed claimed in claim 14, wherein the monobasic acid is HCl.

17. A stabilized heat-cured rutile inducing seed comprising nuclei of an oxide of a metal of the fourth group dispersed in a monobasic acid and stabilized with stabilizer in amount of 0.5 to 6.5% by weight of the content of the oxide of the metal of the fourth group, said stabilizer having polyvalent anions and on calcination volatilizing before the temperature reaches 950° C., and the molar ratio of monobasic acid to oxide of the metal of the fourth group being from about 1 to 2.2.

18. The seed claimed in claim 17, wherein the content of the oxide of the metal of the fourth group is 20 to 90 grams per liter.

19. The seed claimed in claim 17, wherein the monobasic acid is HCl.

MAX J. MAYER.

REFERENCES CITED

The following references are of record in the file of this patent:

UNITED STATES PATENTS

| Number | Name | Date |
| --- | --- | --- |
| 1,361,867 | Jebsen | Dec. 14, 1920 |
| 1,758,528 | Mecklenburg | May 13, 1930 |
| 1,766,592 | Blumenfeld | June 24, 1930 |
| 2,062,133 | Kubelka | Nov. 24, 1936 |
| 2,303,306 | Tillmann | Nov. 24, 1942 |
| 2,369,262 | Stark | Feb. 13, 1945 |

FOREIGN PATENTS

| Number | Country | Date |
| --- | --- | --- |
| 405,669 | Great Britain | Feb. 12, 1934 |